W. S. PRICE.
VEHICLE WHEEL.
APPLICATION FILED MAR. 4, 1916.
1,242,237.
Patented Oct. 9, 1917.
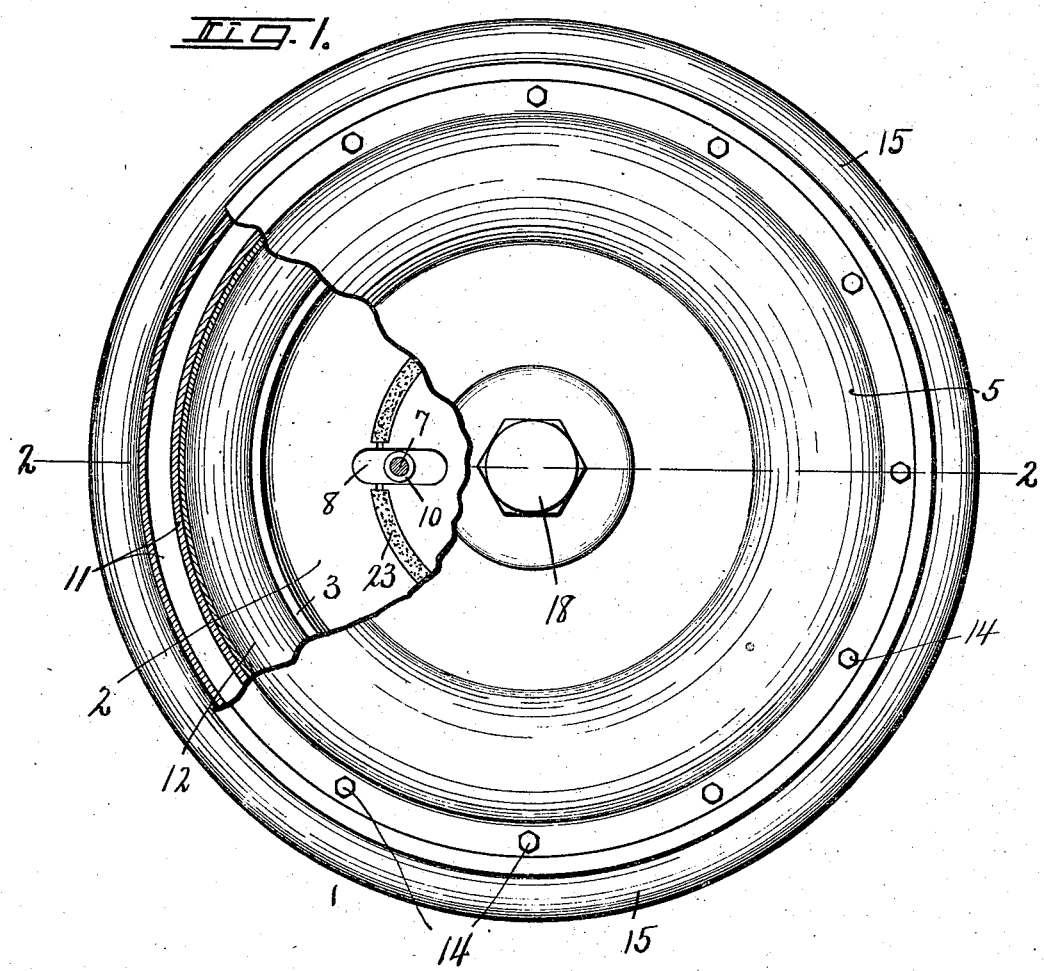
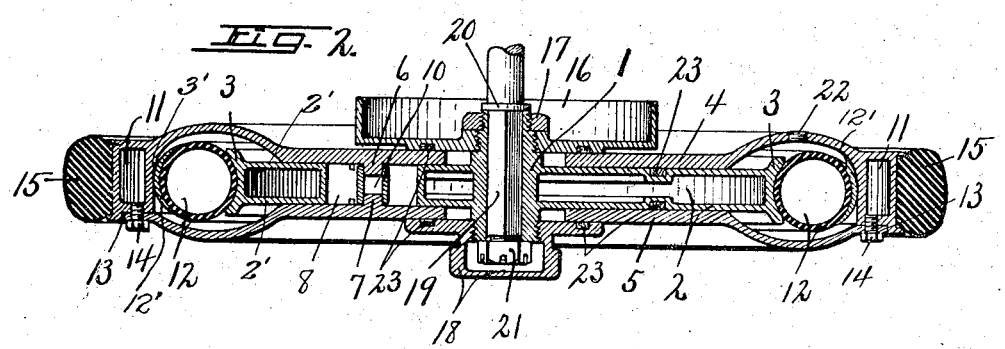
WITNESSES:
INVENTOR
Willard S. Price
BY
Howard P. Denison
ATTORNEY

UNITED STATES PATENT OFFICE.

WILLARD S. PRICE, OF SYRACUSE, NEW YORK.

VEHICLE-WHEEL.

1,242,237.     Specification of Letters Patent.     Patented Oct. 9, 1917.

Application filed March 4, 1916. Serial No. 82,110.

*To all whom it may concern:*

Be it known that I, WILLARD S. PRICE, a citizen of the United States of America, and resident of Syracuse, in the county of Onondaga, in the State of New York, have invented new and useful Improvements in Vehicle-Wheels, of which the following, taken in connection with the accompanying drawings, is a full, clear, and exact description.

This invention relates to certain improvements in wheels for motor and like vehicles.

The object of the invention is to produce a wheel of the character specified provided with a pneumatic cushioning means or tire, arranged so that the resiliency of such tire may be utilized while at the same time it is protected from injury or puncture, and is not subjected to actual wear due to contact with the road. Or, reversely, to produce a wheel of the hard rubber tread type having in combination a resilient pneumatic cushioning means.

Other objects and advantages will appear from the following description, taken in connection with the accompanying drawings, in which—

Figure 1 is a side elevation, partly in section, of the wheel.

Fig. 2 is a cross section on line 2—2, Fig. 1.

As shown, the wheel comprises a hub —1— having a radiating circular concentric web or disk —2— as shown, formed integral with the hub and cast hollow or cored, forming spaced walls —2'—, and terminating in a transversely concave circular secondary rim —3—, thus constituting what may be termed an inner wheel or main section. The web or disk —2— performs the function of the usual spokes and carries the rim, which in turn carries the pneumatic cushioning means.

A pair of side plates —4— and —5— having central openings of considerably greater diameter than and fitted over the hub —1— and movable relatively thereto in a plane perpendicular to the axis of the wheel, are disposed upon opposite sides of the disk —2— and have alined circular lugs or projections —6— and —7— extending inwardly from the respective plates and positioned in opposite sides of an elongated substantially radially disposed slot —8— formed in the disk —2— and adapted to limit the movement of the plates relatively to the disk. The lugs are connected and the plates caused to move simultaneously by a cylindrical roller —10— positioned in the slot —8— and having its opposite ends fitted over the respective projections —6— and —7— and rotatable relatively thereto thus constituting a boltless driving lock between the disk and outer casing.

One of the side plates, as —4—, carries a laterally extending circular primary rim —11— having an inner annular seat —3'— spaced from the secondary rim —3— a distance slightly less than the effective diameter of an inflated tube —12— mounted on the concave secondary rim —3— and having its line of greatest circumference in contact with the primary rim —11— to normally and resiliently space the parts an equal distance apart throughout their concentric marginal portions, said rim —11— and side plates —4— and —5— constituting a casing which incloses the inner rim —3— and pneumatic tube —12—.

The tube —12— may be of any suitable or desirable construction, as an ordinary rubber tube, and preferably the marginal portion adjacent the rim —11— is provided with a facing 12' of leather or other suitable material protecting the tube from direct contact with the rim.

The opposite plate —5— has its marginal portion positioned in a seat —13— in the side of the rim —11— and is removably secured to the rim in any suitable manner, as by bolts —14—. The rim —11— is preferably, as shown, formed integral with one of the plates, as —4—, and may be cast hollow or cored if desired and is formed for the reception of a suitable tread, as a hard rubber tire —15— which may be positioned between radially extending circumferential flanges upon the rim or may be vulcanized or otherwise secured thereto, as desired.

The plates —4— and —5— adjacent the tube —12— are preferably formed convex or bowed outwardly to form a free space for allowing expansion of the tube, which tube is loosely mounted on the concave secondary rim —3— and is free to move and respond to strains in all directions.

The projections —6— and —7— and the roller —10— movable in the slot —8— allow a limited rocking rotative movement of the plates —4— and —5— relatively to the disk —2—, allowing the sudden application of stress or strain to be applied directly to the pneumatic tube —12—, giving to the wheel the same resiliency as the ordinary pneumatic tired wheel while at the same time the tube is entirely inclosed and is not subjected to direct contact with the road.

The opposite ends of the hub —1— are preferably threaded, the inner end for the reception of a suitable internally threaded brake drum —16— held in substantial contact with the plate —4— by a locking nut —17—. The opposite end of the hub —1— is adapted to receive an internally threaded cap —18— inclosing the hub, and a suitable shaft —19— positioned in the hub has a flange —20— in contact with the inner end of the hub and is locked in operative position by a nut —21— threaded upon the end of the shaft and positioned within the cap —18—.

Preferably, one of the plates, or both of the plates —4— and —5—, at the convex portion adjacent the tube —12—, are provided with an automatic air releasing valve —22— of any suitable and well known construction for releasing the air within the chamber formed between said plates should the same become compressed beyond a predetermined degree. Suitable packing —23— may be positioned, as shown, between the contacting portions of the parts.

It will be readily apparent that the wheel disclosed combines the advantages of a hard rubber tread with the pneumatic cushioning means of the ordinary pneumatic wheel, reducing to a minimum the danger of injury or puncture of the pneumatic tube —12—, and although I have shown and described one particular construction, form and arrangement of the parts, I do not desire to limit myself to the same, as many changes may be made in the details of form, arrangement and construction without departing from the spirit of this invention as set forth in the appended claim.

What I claim is:—

A vehicle wheel comprising a hub and rim united by a hollow annular web having a radial slot, a pneumatic tube fitted on the periphery of the rim, and a casing inclosing the rim and slidably engaged with opposite sides of the web across the slot and provided with integral lugs projecting from opposite sides thereof into the slot in spaced relation to establish a boltless driving lock between the web and casing, said casing having a tire-receiving rim supported directly upon the periphery of the pneumatic tube.

In witness whereof I have hereunto set my hand this 25th day of February, 1916.

WILLARD S. PRICE.

Witnesses:
E. A. THOMPSON,
M. VIOLA HOWLAND.

Copies of this patent may be obtained for five cents each, by addressing the "Commissioner of Patents, Washington, D. C."